United States Patent [19]
Harrington

[11] Patent Number: 5,966,461
[45] Date of Patent: Oct. 12, 1999

[54] REDUCTION OF FALSE CONTOURS BY CHROMINANCE MODULATION

[75] Inventor: Steven J. Harrington, Webster, N.Y.

[73] Assignee: Xerox Corporation, Stamford, Conn.

[21] Appl. No.: 08/826,173

[22] Filed: Mar. 27, 1997

[51] Int. Cl.⁶ .............................. G06K 9/00; G03F 3/08
[52] U.S. Cl. ....................... 382/167; 358/520; 358/523; 358/534; 348/631
[58] Field of Search .................................. 382/162, 166, 382/167; 358/518, 520, 530, 534, 523; 345/155; 348/631

[56] References Cited

U.S. PATENT DOCUMENTS

| | | | |
|---|---|---|---|
| 4,758,885 | 7/1988 | Sasaki et al. | 358/80 |
| 4,812,903 | 3/1989 | Wagensonner et al. | 358/80 |
| 5,170,152 | 12/1992 | Taylor | 358/518 |
| 5,278,678 | 1/1994 | Harrington | 358/518 |
| 5,341,464 | 8/1994 | Friedman et al. | 345/155 |
| 5,343,311 | 8/1994 | Morag et al. | 358/518 |
| 5,455,600 | 10/1995 | Friedman et al. | 345/153 |
| 5,517,334 | 5/1996 | Morag et al. | 358/518 |
| 5,543,820 | 8/1996 | Edgar | 345/153 |
| 5,608,548 | 3/1997 | Sobol | 358/520 |
| 5,615,312 | 3/1997 | Kohler | 358/520 |
| 5,796,385 | 8/1998 | Rich | 345/155 |

OTHER PUBLICATIONS

"Bit–Stealing: How to Get 1786 Gray Levels from an 8 Bit Color Monitor" by S. W. Tyler et al. presented at the 1992 SPIE/S&T Symposium on Electronic Imagaing Science and Tech. vol. 1666.

*Primary Examiner*—Amelia Au
*Assistant Examiner*—Jongge Wu

[57] ABSTRACT

A system and method for eliminating luminance false contours within rendered documents by sacrificing chrominance accuracy within printer halftones and for using the reduction of chrominance to improve the luminance correctness for any requested color. Ordinary halftone processes are modified such that small hue shifts are traded off for the ability to eliminate luminance false contours. Luminances of colored inks are created in a manner that turns on only one color spot at a time, instead of all three, within a slowly changing gray area because numerically equivalent steps in chrominance are much less visible in printed form than changes in luminance. Removal of false contours is therefore achieved by chrominance variations rather than by spatial variations in a document.

7 Claims, 5 Drawing Sheets

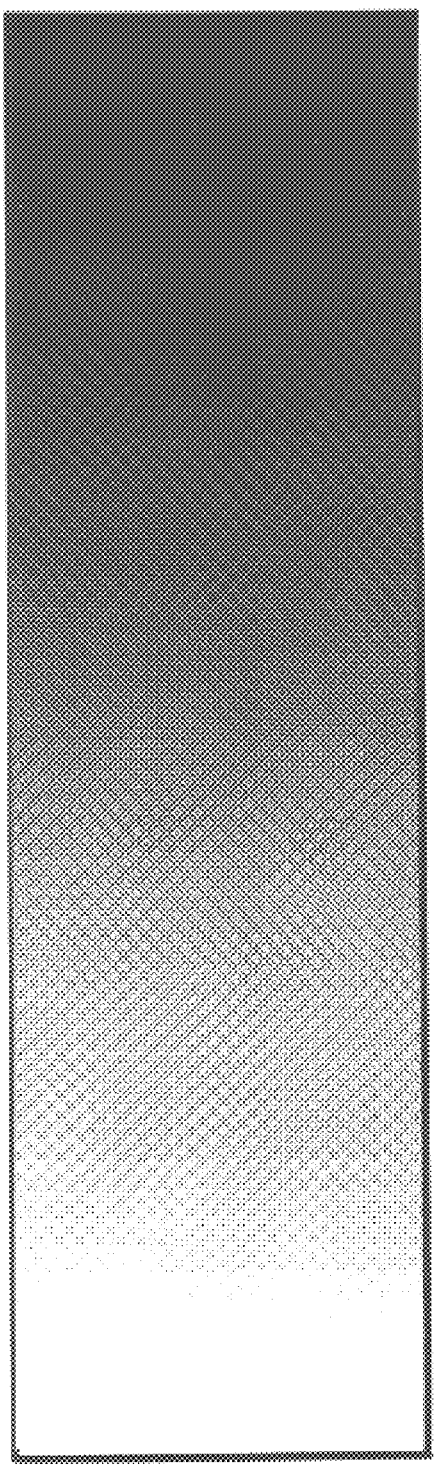
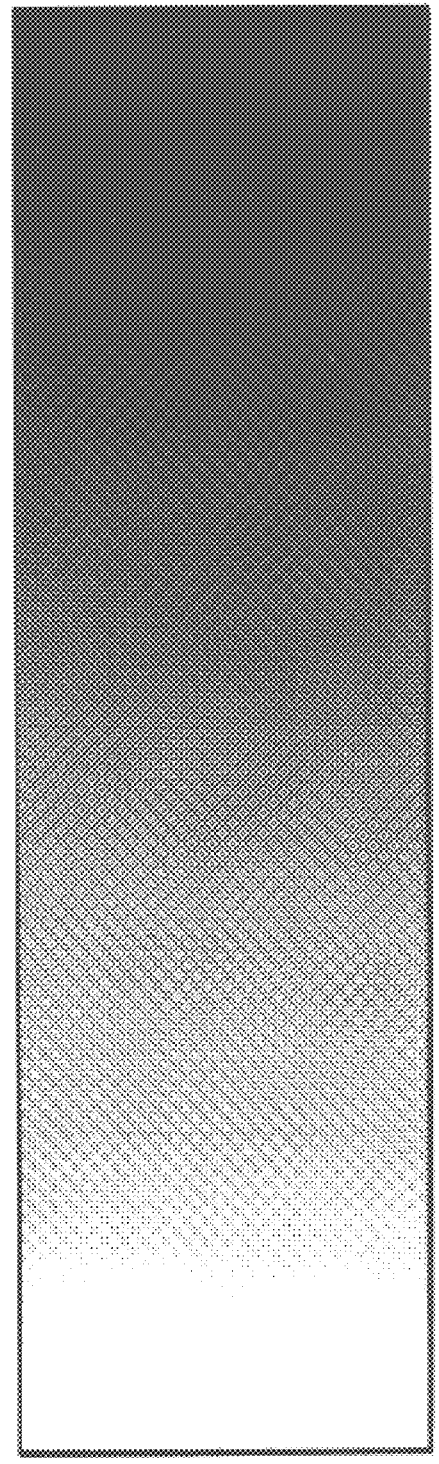
FIG. 1A
FIG. 1B

REDUCTION OF FALSE CONTOURS BY CHROMINANCE MODULATION

FIELD OF THE INVENTION

The invention is generally related to image processing during document rendering activities and, more particularly, to the reduction of false contours seen in a rendered image by an increase of luminance steps during document processing whereby the halftone level of individual color separations are incremented resulting in small chrominance errors, yet preserving fine spatial texture.

BACKGROUND OF THE INVENTION

In today's high-tech office, documents are often created in electronic form and then printed. Tools for document creation have become increasingly powerful such as advances in high-resolution laser printers and the emerging support for full color printing. One of the problems that arises with the current technology is that the user may be surprised to find that the printed output does not look the same as the electronic image displayed on the workstation. Many programs try to make the two images match, supporting a what-you-see-is-what-you-get approach. Hardware differences, however, may make true matching impossible. One such difference is resolution. A laser printer may be able to print at 300 dpi while the workstation may support only about a quarter of this density. A compensating difference is that a sophisticated display may support continuous gray levels and/or colors, while a print may have to use halftones. A color display will often be driven through a 256 element color lookup table, limiting the number of colors which may be displayed at any one time, while a printer, using halftones, can produce many more. Finally, the color primaries and white point of the workstation may be different from the inks and paper available at the printer.

In image displays, such as CRTs, the problem of low resolution in the display can be reduced by use of the display's intensity level. In computer graphics, this technique has long been used to reduce the aliasing effects of the low resolution display. Effects such as "jaggies" in lines as they cross pixel boundaries, and "drop out" of small objects which fall between the pixels, are countered by setting the pixel intensities to intermediate levels to reflect that part of the pixel which is covered by the object and the part which is not. Perhaps the simplest anti-aliasing technique is to compute the image at a higher resolution, and then average the pixel values to obtain the lower resolution intensity. For example, if the image was created at four times the resolution, then four by four blocks of pixels would be averaged to obtain the display pixel value. This is, in effect, saying that the display pixels are non-overlapping squares with abrupt edges. Real pixels tend to be round and overlapping, with tapering edges. More sophisticated techniques apply a digital filter to the high-resolution image which, in effect, convolves the image with the pixel profile. However, in the area of desktop publishing, the effects of resolution are strongly apparent in text. Fonts available for the coarse screen resolution are large and simplistic. They cannot show the subtle effect of different font selections. Their size may make them out of proportion to the rest of the page. One may be unable to place the characters in the same positions as on the printed page due to crowding, giving either false page layout and line breaks, or some unreadable representation of the page. The anti-allasing techniques of computer graphics have been applied to the display of text. The fine elements and nonintegral pixel widths of character strokes become partially illuminated pixels. This gives the illusion of increased resolution, and permits much smaller font sizes to be displayed. It also permits the placing of characters at non-integral pixel positions.

The human visual system is able to distinguish a large number of colors. To cover this range of colors, display devices often provide 256 choices (8 bits) for each of the three primary colors, red, green and blue. This is a total of 24 bits or $2_{24}$ possible colors. To simultaneously render any or all of these colors requires a backing frame buffer with 24 bits per pixe. To reduce cost, displays usually provide a smaller pallet of colors which may be selected from this larger set. This is implemented by means of a color lookup table. A 256 entry table can be accessed by an 8-bit index. Each table entry can contain a 24-bit color specification. Thus, a frame buffer with only 8-bits per pixel can be used by looking up each pixel value in the color table to obtain 24-bit color. The display can produce $2^{24}$ colors, but can render only 256 of them at any one time.

Color lookup tables have proven useful By changing a value in a color lookup table, one can alter the appearance of all the pixels which reference this table entry. This is much faster than altering the pixels individually. Color tables can support fast color manipulation, structuring of the image, color correction, and even animation effects. The limited set of simultaneous colors, however, presents a problem concerning which colors should be chosen for the color table entries. Scanned images and some computer generated effects contain far more colors than the allowed 256. One must somehow pick colors that do not deviate too far from the true colors of the image. One would also like to reduce the false contours which arise when a smooth variation in color is displayed as a jump between one producible color and the next—this is just allasing in color space. One approach to this problem is to first analyze the image to determine which colors are most representative—this can be a costly process. Another alternative approach is to set the table to a fixed set of distributed colors, and then superimpose halftoning techniques to give the appearance of intermediate colors. In this approach, resolution is being traded for intensity levels of the color primaries. The halftone screen is used to choose between the available bounding colors for each pixel A rectangular, dispersed dot screen applied to each of the primary color components is straightforward and adequate. It also allows one to display the image as it is drawn. An error diffusion approach has also been tried which gives slightly better results, but must be applied to the entire image and is not used with individual image components.

Since color is a three-dimensional space, halftoning is applied three times for each pixel to achieve the appearance of intermediate values for each of the three color coordinates. The elements of the color lookup table are partitioned along the color coordinate axis to support the independent halftoning of each coordinate. If the coordinate axis is red, green and blue, the 8-bit color table index may be split into three bits of red, three bits of green, and two bits of blue. This gives eight shades of red, eight shades of green, and four shades of blue, plus all their combinations. Blue is chosen to receive only two bits because the eye is less sensitive to blue. An alternative is to allocate six shades of red, six shades of green, and six shades of blue. The color table is thought of as a three-dimensional array with six elements in each dimension which gives the mapping from color coordinates to color table index.

There are many possible coordinate systems used in describing color space besides red, green and blue. One alternative is to rotate and scale the axis so that one corresponds to the luminance Y. Luminance is a measure of how bright the color appears (yellow appears brighter than blue). The other two coordinates give the chrominance information —an approach used in the television industry, which implements the YIQ color mode. The Y component gives the luminance, which is shown on black-and-white sets. All three coordinates are used for color television.

One color encoding standard describes the YES color model Again, Y is the luminance, and the E and S coordinates give the chrominance. The E coordinate is the green to red axis, and the S coordinate is the blue to yellow axis using the red, green, and blue primaries and white point. The YES coordinates are given by:

$$Y=0.253R+0.684G+0.063B$$

$$E=0.5R-0.5G$$

$$S=0.25R+0.25G-0.5B$$

where R, G, B are the red, green and blue coordinates of the color. One advantage of this color model is that the E and S coordinates are very easy to calculate. The YES color coordinates are not visually uniform. Equivalent displacements in these coordinates generally do not appear to the eye as equivalent changes in color. There are visually uniform color spaces, notably the L*a*b* and L*u*v* color models. Using these coordinates for color table assignments and halftoning gives slightly better results, since the colors appear uniformly distributed, and the halftoning is linear with respect to appearance. However, these coordinates are much costlier to calculate.

U.S. Pat. No. 5,278,678 to Harrington discloses a scheme for the color display of images on a device with a moderate sized color table which first builds halftoned binary images for each of the three color components at a multiple of the display resolution. By summing bit values it then determines average values for display resolution pixels. The average values are then mapped to a color table. The YES color coordinate system is used by the Harrington scheme where colors are separated into luminance and chrominance components, allowing more weight to be given to the luminance from which the eye extracts most information. The scheme provides both anti-aliasing of solid areas, such as line and text, and color halftoning to give the appearance of colors between those available from the color table.

U.S. Pat. No. 5,543,820 to Edgar discloses a method for processing color signals representing an image including the steps of obtaining multiple linear color signals representing the image, translating the multiple linear color signals to a linear luminance signal and at least one linear chrominance signal converting the linear luminance signal to a nonlinear luminance signal and converting the linear chrominance signal to an non-linear chrominance signal by dividing the linear chrominance signal by a non-linear luminance signal. The linear processing is directed at producing improved image detail and color.

U.S. Pat. Nos. 5,543,311 and 5,517,334 to Morag et al. provides a plurality of color volume elements which together contain at least a portion of the color space and which in effect quantize the color space. An index value is also provided for each pixel in the image where each index value represents a particular representative color value in the subset of the first plurality of representative color values. The image may then be modified by modifying the representative color values in the subset of the first plurality of representative color values. The image, as modified, may be displayed by using the index value for each pixel.

U.S. Pat. No. 4,812,903 to Wagensonner et al. discloses a system for electronically enhancing an image of a colored original in order to produce a copy of that original RGB color signals are first passed through a gray balancing unit and then to an luminance and chrominance generating unit. In the generating unit, a luminance signal and a pair of chrominance signals corresponding to color image signals of an image to be copied are formed. The luminance signal is processed to enhance sharpness of an image, and one or both of the chrominance signals are also processed in a color saturation adjusting unit. Lookup tables are provided for converting the adjusted chrominance signals back to corresponding RGB color signals.

U.S. Pat. No. 4,758,885 to Sasaki et al. discloses a method of processing color images wherein a high resolution image is converted so that it can be displayed on a lower resolution color printer or the like. An input image of full color is converted over to a L*u*v* system which is based on brightness and saturation. The L*u*v* components are then compressed, converted into CMY signals and sent to a printer. A method of calculating the L*u*v* components from an RGB signal is shown.

While the related art recognizes the problems involved in processing color images on a continuous tone monitor, the art does not provide an efficient and effective rendering of high quality color in a manner which results in minimal false contours on binary marking devices that employ halftoning to create intermediate tones.

A classic problem in printing documents is the representation of intermediate tones (e.g. grays) with fixed level links (e.g. black). This is typically solved by halftoning, which is the printing of a spatially dispersed pattern of solid colored spots (e.g. black and white) which the eye integrates into the desired intermediate level However, for a fixed spot size, producing more gray levels means using patterns with larger spatial areas. Using too large an area results in visible halftone patterns, while too small an area gives too few gray levels and results in false contours in the image. Refer to FIG. 1a for an example of a printed document exhibiting noticeable false contours. One is forced to compromise between these two limitations, and may find it impossible to satisfactorily produce quality print requirements.

A color printer offers new dimensions which can aid with this problem. The eye is much more sensitive to luminance than to chrominance. False contours will be most visible if they arise from steps in luminance. A concept of contour reduction was Gray Levels from an 8 Bit Color Monitor" presented at the 1992 SPIE/IS&T Symposium on Electronic Imaging Science and Technology, Volume 1666—Human Vision, Visual Processing, and Digital Display III, but in a form which was only applied to color monitors and only to ramps of luminance for a single color. The teachings in Tyler et al, however, are not effective for image rendering in printed form.

Therefore, there is a need for a system which can ameliorate the quality tradeoff between halftones and levels that exists in digital systems with low sampling spatial frequencies. Furthermore, there is a need to improve print quality of documents generated by such digital systems.

Therefore, the object of this invention is to provide a method of sacrificing chrominance accuracy within printer halftones and for using it to improve the luminance correctness for any requested color in a printed document, thus reducing false contours typically found in printed documents when luminance adjustments are made.

All of the references cited herein are incorporated by reference for their teachings.

SUMMARY OF THE INVENTION

To achieve the foregoing objects of the invention, and to overcome the shortcomings discussed above regarding false contours that are revealed during document printing, the invention provides a method of sacrificing chrominance accuracy within printer halftones and for using the reduction of chrominance to improve the luminance correctness for any requested color. Ordinary halftone processes are modified such that small hue shifts are traded off for the ability to eliminate luminance false contours. With the invention, different luminances of colored inks are created in a manner that turns on only one color spot at a time, instead of all three, within a slowly changing gray area. Numerically equivalent steps in chrominance will be much less visible. The scheme presented then is to sacrifice chrominance accuracy in order to achieve better luminance behavior. Removal of false contours is done by chrominance variations rather than by spatial variations. Instead of all color components making a transition to a new halftone level at the same threshold value so the colors are always balanced, the invention creates luminances of colored inks in a manner that turns on only one color spot at a time, instead of all three, within a slowly changing gray area because numerically equivalent steps in chrominance are much less visible in printed form than similar changes in luminance.

A method and system is provided which accepts desired color luminance values, compares the desired values with lookup tables which provide the best color output value assigned for each desired luminance value, and a means for providing the new color output values to a printer ink output controller where a document is rendered which has reduced or eliminated false contours.

In applying the method of the invention: initial color values are received for color specifications requested by an image processing system;

a luminance error is determined between said initial color values and typical luminance values produced by halftoning;

a change in luminance is determined for said initial color values which is the difference between said typical luminance values and a value of any next greater halftone levels;

luminance errors and said luminances are processed to determine adjustment values for said initial color values; and new color specifications are determined as a function of the adjustment values and the initial color values for the initial color values;

The new color specifications are provided to said image processing system to render documents displaying reduced luminance false contours within printed documents.

SUMMARY OF THE DRAWINGS

The preferred embodiments and other aspects of the invention will become apparent from the following description which is presented to illustrate a preferred embodiment of the invention when read in conjunction with the accompanying drawings which are provided for the purpose of describing an embodiment of the invention and not for limiting same, in which:

FIG. 1A is an illustration of a printed document without reduced chrominance and chrominance adjustments as taught by this invention disclosure.

FIG. 1B is an illustration of a printed document with the benefit of chrominance adjustment as taught by the invention disclosure.

DETAILED DESCRIPTION OF THE PREFERRED EMBODIMENT OF THE INVENTION

Referring to FIGS. 1a and 1b, an example of the results of utilizing the invention to achieve reduced chrominance is shown by comparison of a printed document without chrominance adjustments (1A) and with chrominance adjustments (1B). FIG. 1A contains a gray wedge printed with a 51 level halftone screen. The wedge seen if FIG. 1a is made by printing equal amount of cyan, magenta and yellow. All the color components within the image make transitions to a new halftone level at the same threshold value so the colors are always balanced. By contrast, through application of the invention the chrominance is corrected, but color components do not step at the same level—first the yellow pattern changes, then the cyan and finally the magenta This means that the chrominance is slightly wrong for most of the print, but the luminance varies in finer steps. The result is greatly reduced luminance contouring while the chrominance errors are not noticeable, as suggested FIG. 1B.

Figure 2:
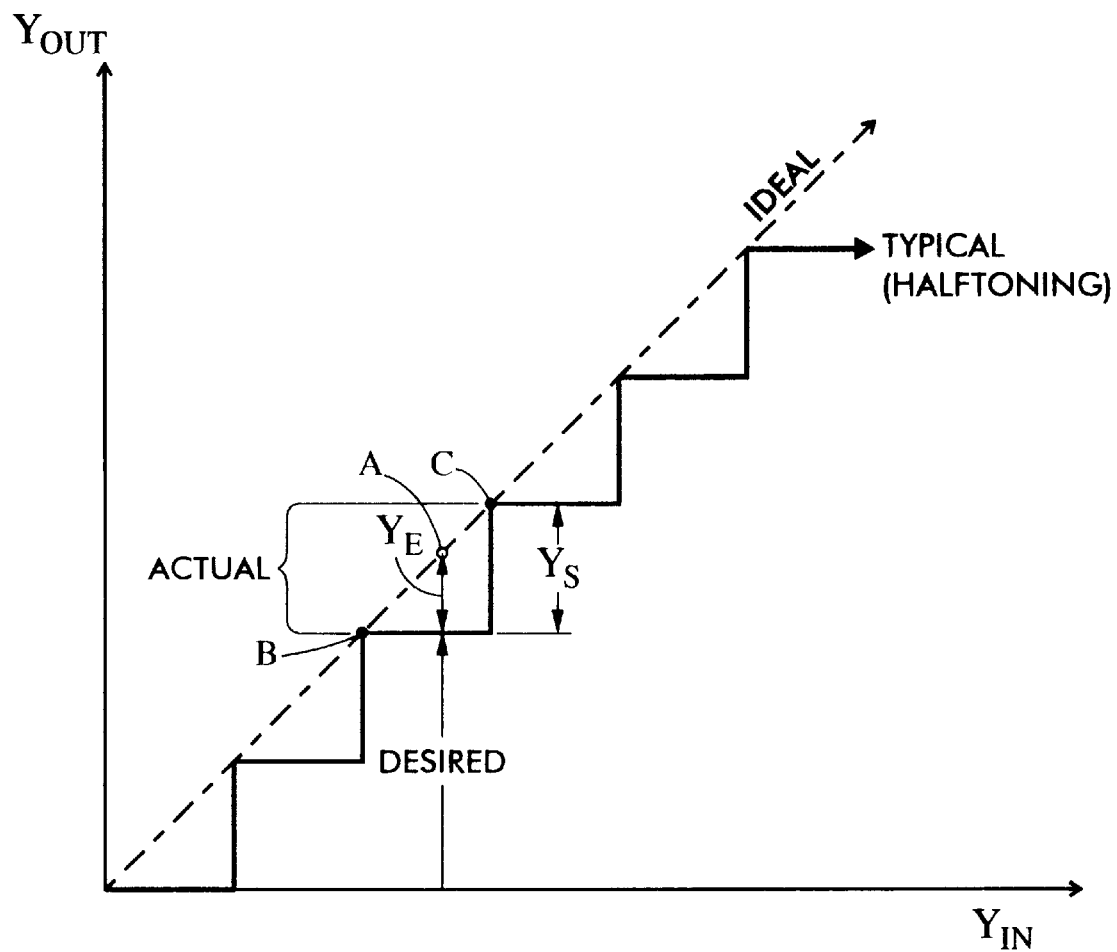
FIG. 2 is a graphical illustration of typical luminances outputs versus ideal luminance outputs, and the luminance error and output step variations found during halftoning.

Assuming a color printer with cyan (C), magenta (M) and yellow (J) ink separations, the printer may accept color specifications to high accuracy (eight or more bits per separation) but the actual halftones used may be unable to produce this many levels (the halftone having only 60 or 70 levels). Referring to FIG. 2, a graphical illustration of the ideal versus typical luminance outputs curves is illustrated. The typical output is a result of halftoning measures that are used in the art to compensate for luminance errors. Also depicted is a desired color output (Point A) requested in a typical system as Yin which results is a lumination value between points B and C. In the prior art, the actual output (Yout) would be either point B or C depending on which point is closest to the desired level. Typically, when a color value is specified (Yin), the closest level (point B or C) is received which the halftone can produce as output (Yout). However, there will be an error (YE) between the luminance desired (point A) by the specification and the luminance actually produced by the halftones (point B or C). The change in luminance (YS) can also be determined (the difference between points B and C) which would occur if the next greater halftone level were selected. As a first-order approximation one can disregard the interaction between color separations and assume we can treat each separation independently. Knowing the halftone properties of the printer we can construct tables which give the luminance error YE[i] and luminance step YS[i] for each color separation value specification i. Separate versions of these tables must be built for each of the cyan, magenta and yellow separations—$YE_C$, $YS_C$, $YE_M$, $YS_M$, $YE_J$, $YS_J$. For a given color specification we can use a table to find the total luminance error as follows:

$$Y_{total} = YE_C[C] + YE_M[M] + YE_J[J]$$

Now, given the total luminance error and the luminance changes that would occur if each of the color separations were printed using the next halftone level ($YS_C[C]$, $YS_M[M]$, $YS_J[J]$) the system can decide whether or not to increment one or more of the color separations to the next level to get a better luminance match. The simplest way to carry this out is to construct a decision table which will be accessed by an index created by concentrating the needed information ($Y_{total}$, $YS_C[C]$, $YS_M[M]$, $YS_J[J]$). This lookup table should contain the increments to the intensities of each separation needed to give the best luminance match. It can be written as separate tables for each separation ($D_C$, $D_M$, $D_J$). The construction of such table is well known in the art as pointed out by the references cited herein and incorporated by reference for their teachings. The invention steps colors alternatively, not all together, resulting in intermediate steps in luminance through slight adjustments in chrominance.

Figure 3:
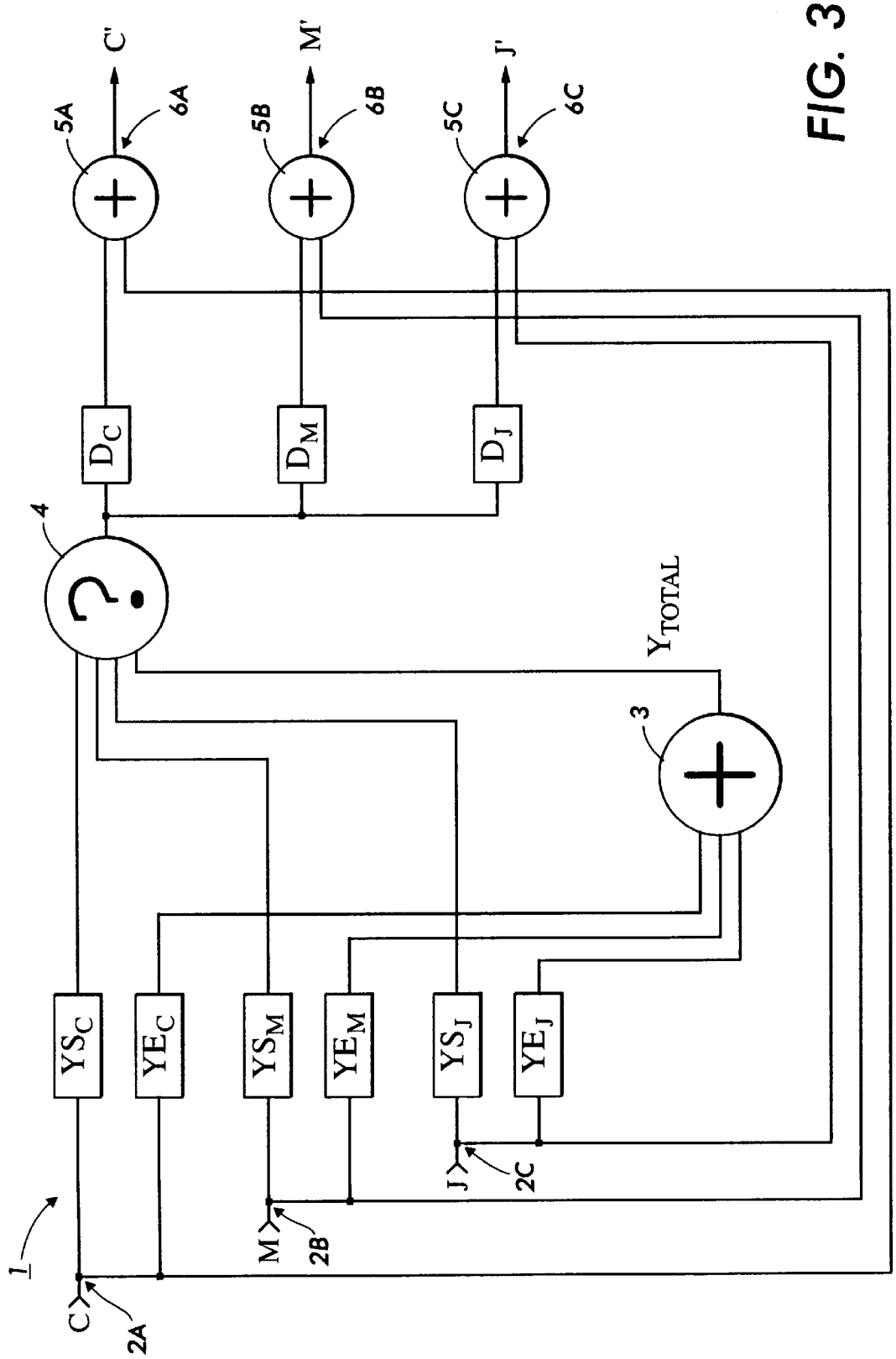
FIG. 3 is a block diagram illustration of the chrominance adjusting system of the invention.
Figure 4A:
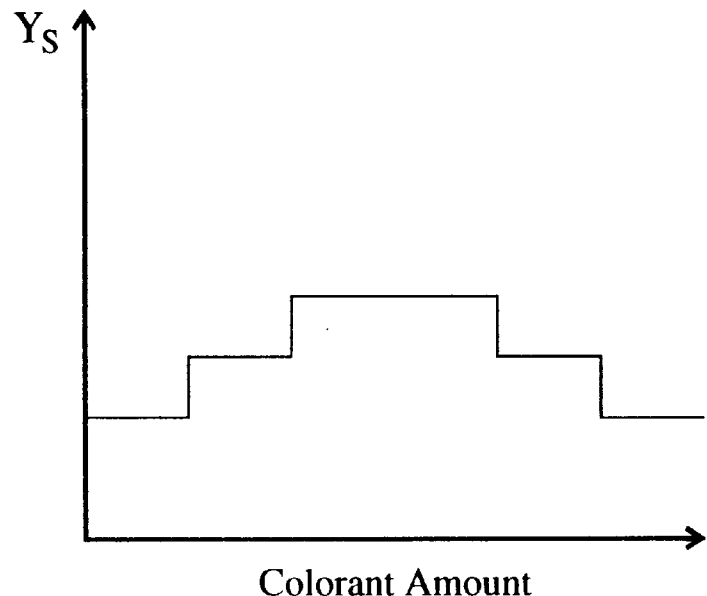
FIG. 4A is a graphical illustration of typical luminance (YS) behavior.
Figure 4B:
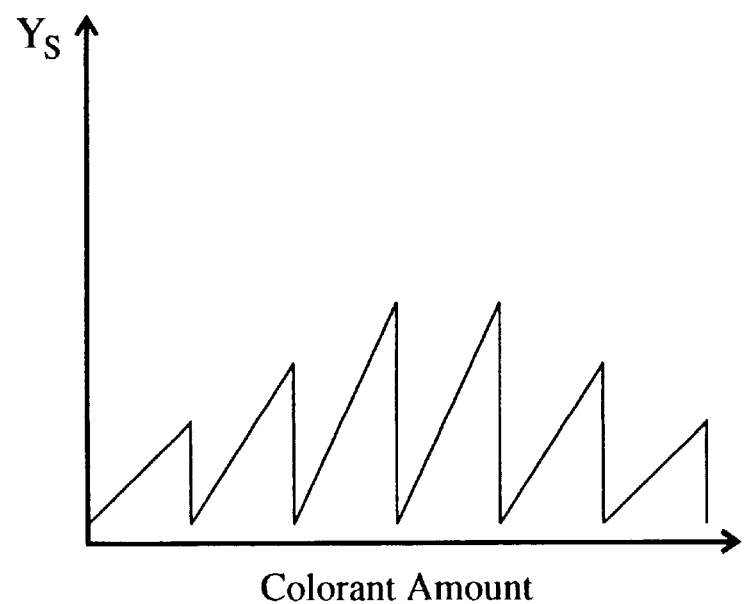
FIG. 4B is a graphical illustration of typical luminance error (YE) behavior.

Referring to FIG. 3, the system 1 provided to accomplish false contour reduction by the alternate chrominance adjustment method of the invention is graphically summarized. Desired color values are provided through inputs 2A–2C at the left side of FIG. 3. While colors can be expressed in a variety of different color coordinate systems, the preferred embodiment specifies the color in the coordinate used for halftoning. This typically is the specification of ink or toner amount, cyan (C), magenta (M), yellow (J) and perhaps black (K). It should be pointed out that black (K) can also be considered in the invention; however, this disclosure is limited to cyan, magenta and yellow for simplicity of description. The ideal colorant amount can be specified to fine precision. For each colorant specification there is an ideal amount of luminance absorption. This is the reduction of luminance that would be caused by the colorant if that ideal level of colorant amount could be placed on the medium. Thus, the presence of the halftone causes an error between the ideal and actual luminance absorption for a specified colorant amount. The error is zero when the specification matches one of the levels that the halftone can produce, but grows smoothly as the colorant amount increases until the next halftone level is reached. FIG. 4A illustrate typical halftone levels that may be produced for a desired luminance YS. Thus, referring to FIG. 4B, the error function, which is related to the outputs desired luminances in FIG. 4a, has an overall sawtooth shape. It is these error functions, determined for the C, M, J colorants, that are saved into tables $YE_C$, $YE_M$, and $YE_J$ respectively, as shown in FIG. 3. Using the colorant amounts to index these tables yields the luminance errors due to halftoning made by each of the colorants. The total luminance error is approximated as the sum of the errors from the components by routing the component error to the adder 3.

Halftones quantize the producible colorant levels to a limited set of values. For any ideal colorant amount one can determine the closest producible levels. The difference in the bounding levels is what is desired—that is, the luminance difference between the halftone level below the idea luminance amount and the halftone level above the ideal level. This difference can be stored in tables $YS_C$, $YS_M$, and $YS_J$, and indexed by the ideal amount. These tables provide the amount by which the luminance would change if one were to employ the upper halftone level instead of the lower halftone value for approximating the desired color.

It has been described how one can determine the total luminance error that would occur if the lower halftone levels are employed, and the adjustments to the luminance possible by changing the halftone level in each of the colorants. One can use this information to decide which halftone levels to select to minimize the luminance error. Note that these values are small since they are changes in luminance and not absolute luminance values. Since they are small numbers only a few bits are needed to represent them. This means that the values can be concatenated to form an index into a table of reasonable size. For example, if one were to allocate two bits for the step size in yellow and two bits for cyan, three bits for magenta and four bits for the total luminance error, then their concatenation gives an eleven-bit index that corresponds to a 2048 element table. Such a table could capture the logic for selection of the optimal halftone levels for a given luminance error and set of step sizes. Note that alternative bit allocations can be used. Also note that the scale of luminance changes corresponding to the index bits need not be the same for each colorant. A two-bit code for yellow need not cover the same luminance range as a two-bit code for cyan. Adjustments for luminance range can be included in the decisions that are used in selecting the best halftone levels.

Referring again to FIG. 3, the decision processor 4 used for converting the information about the luminance error and step sizes into halftone level specification results in increments encapsulated in tables $D_C$, $D_M$ and $D_J$, which provide the possible increments for the final colorant specification values. The invention combines the possible increments with the original color specification at the adders 5A–5C. Depending on their index, the D tables either provide zero which gives the original halftone level or an increment which will step the colorant specification to the next halftone level. This method of selecting halftone levels works best when the halftone thresholds are uniformly spaced. If the halftone levels are nonuniform, then some variation in the method should be employed such as using tables to map values into and/or out of a uniformly varying coordinate.

New chrominance adjustment values from tables $D_C$, $D_M$, and $D_J$ are summed with original chrominance values C, M, and J from system inputs 2A–2C resulting in final values C', M', and J'. The final values are provided at outputs 6A–6C to a document rendering system such as an ink printer. The new ink inputs received by the printer are color separations, C', M' and J', which will result in the substantial reduction or elimination of false contours.

Figure 5:
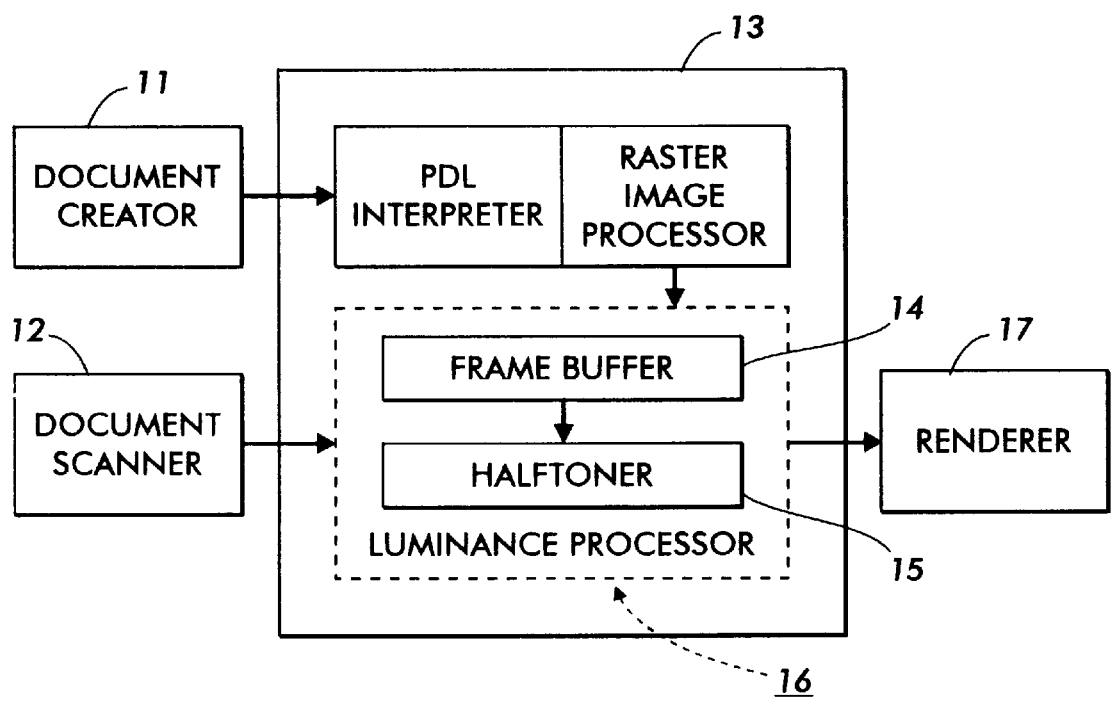
FIG. 5 is a block diagram of a typical system in which the features of the invention would be incorporated.

Referring to FIG. 5, a block diagram of a typical system in which the invention would be implemented is illustrated. The typical system would have a document creation means 11 or a document scanner 12. A document from either means of document generation must be processed by a processor 13. Typical PDL interpretation and raster imaging processing will occur depending on the origin of the document. The document is then processed through a frame buffer 14 and then through a halftoner 15. It is through luminance processor 16 operations which manipulate the frame buffer 14 and halftoner 15 that luminance and chrominance adjustments taught herein can be applied to the document, resulting in reduced halftoning. The adjusted document may then be rendered at a printer 17 or marking devices well known in the art.

The Advantage of the invention is the reduction of false contours in a rendered image by incrementing the halftone level of individual color separations resulting is small chrominance errors, yet preserving fine spatial texture of the resulting image.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

I claim:

1. A method of reducing luminance false contours within printed documents by sacrificing chrominance accuracy within printed halftones, comprising:

receiving initial color values for color specifications requested by an image processing system;

determining a luminance error between said initial color values and typical luminance values produced by halftoning;

determining a change in luminance for said initial color values which is the difference between said typical luminance values and a value of any next greater halftone levels;

processing said luminance errors and said luminances to determine adjustment values for said initial color values; and determining new color specifications as a function of said adjustment values and said initial color values for said initial color values;

wherein said new color specifications are provided to said image processing system to render documents displaying reduced luminance false contours within printed documents.

2. The method of claim 1 wherein said new color specifications comprise color separations that are stepped alternatively resulting in intermediate steps in luminance through slight adjustments in chrominance.

3. The method of claim 2 wherein said color specifications are for cyan (c), magenta (m) and yellow (j).

4. The method of claim 3 wherein said color specifications includes black (k).

5. The invention of claim 1 wherein a determination of whether to increment one or more of said color values to an increased level is made given a comparison of said luminance error and said luminance changes that would occur if each of said color separations were rendered using the next higher halftone level and wherein said image processing system will decide whether to increment one or more of said color separations to the next higher level to get a better luminance match based on information stored in said memory relating to possible increments to said specified colors intensities for each separation needed to provide a best luminance match.

6. The method of claim 5 wherein said steps of determining error and determining luminance steps is implemented by utilizing lookup tables indexed by concatenated values of total luminance error and luminance changes with halftone levels for said color separations.

7. A system for reducing luminance false contours within a printed document, comprising:

receiving means for receiving initial color values for color separation specifications requested by a image processing system;

error determining means for determining the error between said specified color values and typical luminance values produced by halftoning;

luminance step determining means for determining the luminance steps for said initial color values which is the difference between said typical luminance values and the value of the next greater halftone levels;

processing means for processing said luminance errors and said luminance steps to determine adjustment values for said initial color values;

new color specification means for receiving said adjustment values and said initial color values and for providing new color specifications for said initial color values based on a combination of said adjustment values and said initial color values; and means for providing said new color specifications to said image processing system wherein said image processing system will render documents displaying reduced luminance false contours within printed documents.

* * * * *